United States Patent
Storms et al.

(10) Patent No.: US 11,580,315 B2
(45) Date of Patent: Feb. 14, 2023

(54) AGILE TIME-CONTINUOUS MEMORY OPERATION FOR A RADIO FREQUENCY IDENTIFICATION TRANSPONDER

(71) Applicant: NXP B.V., Eindhoven (NL)

(72) Inventors: Maurits Mario Nicolaas Storms, Best (NL); Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/786,109

(22) Filed: Feb. 10, 2020

(65) Prior Publication Data
US 2021/0248331 A1   Aug. 12, 2021

(51) Int. Cl.
  *G01R 31/30*   (2006.01)
  *G06K 7/10*   (2006.01)
  *G06K 19/07*   (2006.01)

(52) U.S. Cl.
  CPC ..... *G06K 7/10198* (2013.01); *G06K 19/0707* (2013.01); *G06K 19/0712* (2013.01); *G06K 19/0723* (2013.01); *G06K 7/10366* (2013.01)

(58) Field of Classification Search
  CPC .......... G06K 7/10198; G06K 19/0707; G06K 19/0712; G06K 19/0723; G06K 7/10366; H03G 3/3047; H03G 2201/307; H03G 2201/00; H03G 2201/30; H01L 22/20; H01L 2924/0002; H01L 24/00; H01L 2224/00; G01R 31/2607; G01R 31/30; G01R 31/31723; H03F 3/211; H04N 7/102; H04N 5/4446; H04N 5/52
  See application file for complete search history.

(56) References Cited

U.S. PATENT DOCUMENTS

| | | | |
|---|---|---|---|
| 5,680,459 A * | 10/1997 | Hook | G06Q 20/367 705/13 |
| 7,136,978 B2 | 11/2006 | Miura et al. | |
| 7,151,701 B2 | 12/2006 | Combe et al. | |
| 8,341,501 B2 | 12/2012 | Franceschini et al. | |
| 9,384,818 B2 * | 7/2016 | Adelman | G06F 3/0688 |
| 2003/0022687 A1 * | 1/2003 | Iida | H03G 3/3047 455/69 |

(Continued)

FOREIGN PATENT DOCUMENTS

| CN | 104637522 A |   | 5/2015 |
|---|---|---|---|
| CN | 104765577 A | * | 7/2015 |

(Continued)

*Primary Examiner* — Hai Phan
*Assistant Examiner* — Anthony D Afrifa-Kyei
(74) *Attorney, Agent, or Firm* — Shuqian Yan (57) ABSTRACT

A radio frequency identification (RFID) transponder includes a current control module for controlling a current consumption of a memory based on an amount of available power, and a control logic for controlling a memory operation in response to the control of the current consumption by the current control module. The RFID transponder further includes a power detector that is configured to continuously monitor and detect the amount of available power and output a power-dependent control signal. The power-dependent control signal is used by the RFID transponder to control the current consumption of the memory in dependence on the available power.

18 Claims, 8 Drawing Sheets

(56) References Cited

U.S. PATENT DOCUMENTS

| | | | |
|---|---|---|---|
| 2004/0104771 A1* | 6/2004 | Dauphinee | H03G 3/3036 |
| | | | 348/E7.052 |
| 2004/0136255 A1* | 7/2004 | Crain | G11C 7/067 |
| | | | 365/208 |
| 2007/0046369 A1* | 3/2007 | Schober | G06K 19/0707 |
| | | | 330/7 |
| 2007/0223282 A1* | 9/2007 | Sarig | G11C 16/0441 |
| | | | 365/185.23 |
| 2008/0204333 A1 | 8/2008 | Lamothe | |
| 2013/0299593 A1 | 11/2013 | Glidden, III | |
| 2015/0145591 A1 | 5/2015 | Fischer et al. | |
| 2017/0098469 A1* | 4/2017 | Park | G11C 5/025 |
| 2020/0008299 A1* | 1/2020 | Tran | H05K 1/0386 |

FOREIGN PATENT DOCUMENTS

| | | |
|---|---|---|
| CN | 104765577 A | 7/2015 |
| CN | 104810049 A | 7/2015 |

* cited by examiner

FIG. 8

AGILE TIME-CONTINUOUS MEMORY OPERATION FOR A RADIO FREQUENCY IDENTIFICATION TRANSPONDER The present disclosure generally relates to radio frequency identification (RFID) integrated circuits (ICs) and more particularly to an RFID transponder.

RFID transponders are widely used in different areas of industry and commerce and for various purposes. RFID transponders may for example be embodied as so-called RFID tags or RFID cards. An RFID transponder may include at least three parts: an integrated circuit that stores and processes information and that modulates and demodulates radio frequency (RF) signals; a means of collecting direct current (DC) power from an incident reader signal; and an antenna for receiving and transmitting signals. A non-volatile memory (e.g., EEPROM) is used for storing the device's unique identification number and other related information.

A key characteristic of an RFID transponder is that it contains no power source such as a battery. Yet it is designed to transmit its digital code to some external reading device whenever it is interrogated. The interrogation takes place when an external reader made up of a transmitter (TX) sends a radio frequency (RF) signal to a nearby RFID transponder. The radio frequency energy received by the transponder's antenna is then rectified and filtered into a DC voltage that is used to power up the memory and other circuits such as the modulator circuit that sends data back to the reader. Thus, the higher the radio frequency energy is received, the more power is allowed to be consumed by the memory and other circuits of the transponder, or vice versa.

State-of-the-art ultra-low power memories, such as those used for HF (high frequency) or UHF (ultra-high frequency) RFID tags, consume more energy during a write operation than during a read operation. Under low power conditions this might cause the memory run out of power during the write operation. To overcome the above problem, state-of-the-art ultra-low power memories have the option to change the write speed depending on the available power. This may be achieved by sampling a power indicator in a time discrete way to balance the write speed and the available power. A higher sampling frequency (of the power indicator) increases the accuracy and reduces the risk-to-fail due to potential power loss. However, a big drawback of a higher sampling frequency is high current consumption and therefore a strong impact to the ultra-low power memories. Therefore, the state-of-the-art implementations are either limited to those that are not ultra-low power memories, or the sampling frequency resolution limits the accuracy and robustness.

Furthermore, the discrete-time sampling approach as mentioned above may not work if the available power falls fast, like for a UHF (ultra-high frequency) field. It may happen that the write operation is stopped too late and therefore the whole system runs out of power or even resets.

SUMMARY

A radio frequency identification (RFID) transponder includes a current control module for controlling a current consumption of a memory based on an amount of available power, and a control logic for controlling a memory operation in response to the control of the current consumption by the current control module.

In one embodiment, the RFID transponder includes a power detector that is configured to continuously detect the amount of available power from an external radio frequency (RF) field and output a power-dependent control signal.

In one embodiment, the power-dependent control signal is a power indicator signal indicative of the amount of available power.

In one embodiment, the power detector includes a first comparator that is configured to compare a power indictor signal indicative of the amount of available power with a first threshold and output a power-dependent control signal to die current control module in response to the comparison by the first comparator.

In one embodiment, the power detector includes a second comparator that is configured to compare a power indictor signal indicative of the amount of available power with a second threshold and output a power-dependent control signal to the current control module in response to the comparison by the second comparator.

In one embodiment, the second threshold is an upper threshold and the first threshold is a lower threshold.

In one embodiment, the current control module is configured to control the current consumption of the memory in response to the power indicator signal indicative of the amount of available power.

In one embodiment, the current control module is configured to control the current consumption of the memory in response to the power-dependent control signal output by the first comparator.

In one embodiment, the current control module is configured to control the current consumption of the memory in response to the power-dependent control signal output by the second comparator.

In one embodiment, the current control module includes a PMOS transistor.

In one embodiment, the power indicator signal is applied to a gate of the PMOS transistor.

In one embodiment, the power-dependent control signal output by the first comparator is applied to a gate of the PMOS transistor.

In one embodiment, the power-dependent control signal output by the second comparator is applied to a gate of the PMOS transistor.

In one embodiment, the RFID transponder includes a charge pump module coupled to the current control module and the memory and configured to provide an output voltage to the memory.

In one embodiment, the current control module is configured to control the current consumption of the memory by controlling an amount of current received by the charge pump module.

In one embodiment, the control logic is operatively coupled to the charge pump module and the memory and configured to control the charge pump and the memory.

In one embodiment, the control logic is configured to stop, slow down, or start a memory operation in response to an amount of current received by the charge pump module.

In one embodiment, the control logic is further coupled to the power detector and receives the power-dependent control signal from the power detector.

In one embodiment, the RFID transponder is an RFID tag.

A method for operating a radio frequency identification (RFID) transponder includes detecting an amount of power available to the RFID transponder, controlling a current consumption of a memory of the RFID transponder in response to the amount of available power detected, and controlling a memory operation in response to the controlling of the current consumption.

In one embodiment, detecting an amount of power available to the RFID transponder includes continuously tracking an external radio frequency (RF) field and outputting a power indicator signal indicative of the amount of available power.

In one embodiment, detecting an amount of power available to the RFID transponder includes comparing the power indictor signal with a first threshold and outputting a first power-dependent control signal.

In one embodiment, detecting an amount of power available to the RFID transponder further includes comparing the power indictor signal with a second threshold and outputting a second power-dependent control signal.

In one embodiment, controlling a current consumption of a memory of the RFD transponder includes controlling an amount of current received by a charge pump in response to the amount of available power detected. The charge pump supplies an output voltage to the memory.

In one embodiment, controlling; a memory operation includes stopping, slowing down or starting a memory operation in response to the controlling of the current consumption.

The above discussion is not intended to represent every example embodiment or every implementation within the scope of the current or future Claim sets.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 1:
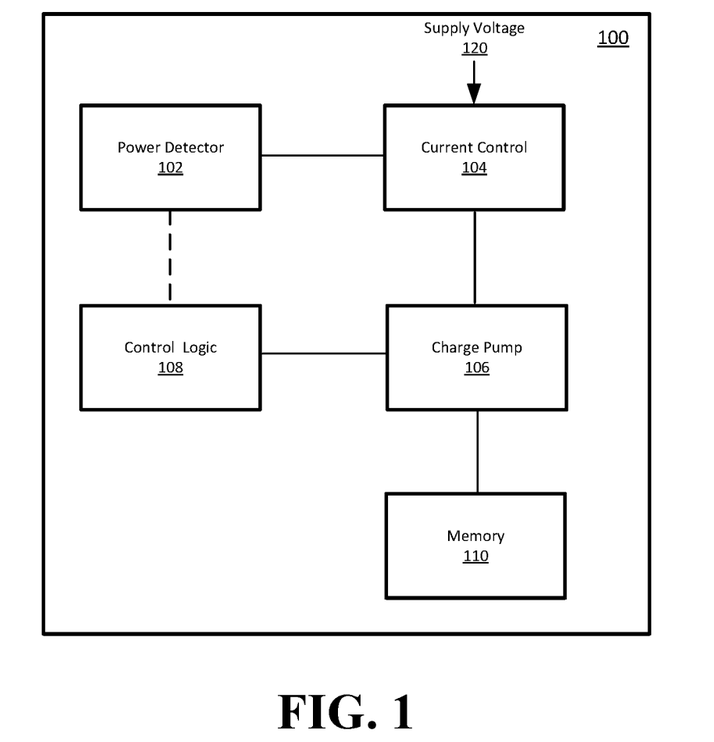
FIG. 1 is an example RFID transponder.

FIG. 1 shows an example RFID transponder 100. RFID transponder 100 comprises a power detector 102, a current control module 104, a charge pump 106, a control logic 108, and a memory 110. It is noted that RFID transponder 100 may also include other functional components that are not shown as they are not directly relevant to our discussions here. The following describes in detail each of the functional components depicted in FIG. 1.

As depicted in FIG. 1, power detector 102 is configured to detect the amount of power available to the RFID transponder and generate a power-dependent control signal at its output based on the amount of available power detected.

In one embodiment, the power-dependent control signal generated at the output of the power detector is derived directly from the amplitude of an RF field generated by an RFID reader (not shown) that is external to the RFID transponder 100. For example, the external radio frequency (RF) field generated by the RFID reader can be tracked by using an envelope detector and the field strength can be determined by a field strength determination unit of the RFID transponder. The field strength is indicative of the amount of power available to the RFID transponder. Alternatively, or in addition, the internal voltage level of the RFID transponder can be tracked. This voltage level is also indicative of the available amount of power. In another implementation, an indirect measure of the available amount of power may be used. For example, the RFID transponder may also comprise a voltage limiter. In that case, it may be determined whether the voltage limiter is active or not. This, in turn, may be a suitable indication of the available amount of power.

Hereinafter, the term "power indicator signal" is referred to the signal that is indicative of the available amount of power to the RFID transponder. The power indicator signal has a faster fall-time if the RF field strength, and thus the available energy, is lower. Conversely, for higher field strengths the power indicator signal has a slower fall-time.

Thus, in the above embodiment, the power-dependent control signal generated at the output of the power detector is the power indicator signal.

In an alternative embodiment, the power-dependent control signal generated at the output of the power detector is an output signal of one or more comparators. For example, the power detector may include one or more comparators that are configured to continuously compare the value of the power indicator signal with one or more thresholds and generate an output signal at the output of the power detector as the power-dependent control signal.

Referring to FIG. 1, current control module 104 is operatively coupled to power detector 102 and configured to control the current consumption of memory 110 based on the amount of available power detected by the power detector. Specifically, in the shown embodiment, current control module 104 receives the power-dependent control signal from power detector 102 and use the control signal to control the amount of current that can be consumed by the memory via charge pump 106 (as explained below). A supply voltage 120, which may also be derived from the RF field generated by the external RFID reader, is provided to the input of the current control module.

As depicted in FIG. 1, charge pump 106 is operatively coupled to current control module 104 and control logic 108. The charge pump receives an input voltage (current) from current control module 104 and supplies an output voltage to memory 110 to enable it to perform various memory operations. Here, the amount of current that are provided to the charge pump is controlled by the current control module based on the amount of power available to the RFID transponder.

In one embodiment, charge pump 106 includes one or more drivers (not shown) for driving the charge pump. Specifically, in the shown embodiment, depending on the amount of power available to the RFID transponder, the current control module controls the amount of current that the drivers are allowed to use for providing the driving capability to the charge pump, which in turn for allowing the memory to be programmed faster or lower.

Referring to FIG. 1, control logic 108 is operatively coupled to charge pump 106 and memory 110 and configured to control the operations of the charge pump and the memory. Specifically, control logic 108 is configured to control (stop, slow, or continue) the memory operations in response to the current control as discussed above. In one embodiment, control logic 108 is also coupled to power detector 102 (shown by the dashed line).

Figure 2:
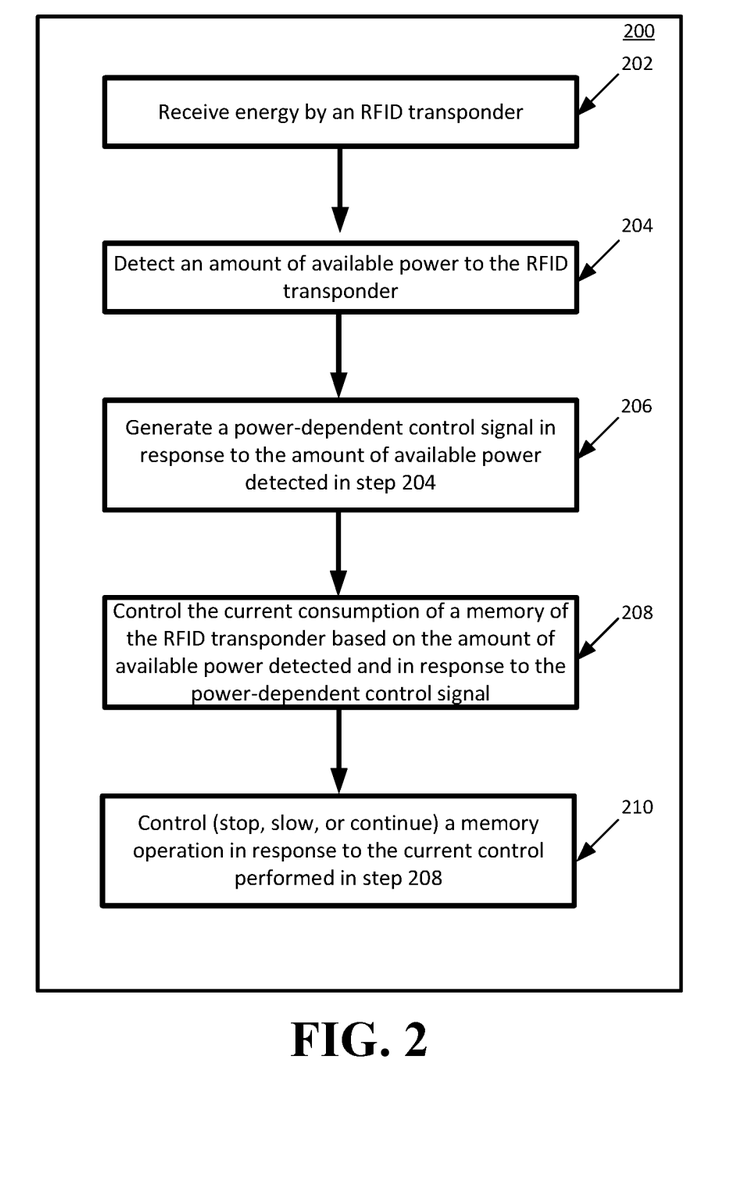
FIG. 2 is a flow diagram illustrating a method of operating an RFID transponder.

FIG. 2 illustrates a method of operating an RFID transponder. In one embodiment, method 200 is implemented for RFID transponder 100 of FIG. 1.

At 202, energy from an RF field generated by an external RFID reader is received by the RFID transponder.

At 204, the amount of available power to the RFID transponder is detected. As mentioned above, the external RF field generated by the RFID reader can be tracked by using an envelope detector and the field strength can be determined by a field strength determination unit of the RFID transponder. The field strength is indicative of the amount of power available to the RFID transponder. Alternatively, the internal voltage level of the RFID transponder can be tracked. This voltage level is also indicative of the available amount of power.

At 206, a power-dependent control signal is generated in response to the amount of available power detected in step 204. In one embodiment, the power-dependent control signal generated at 206 is a power indicator signal indicative of the available amount of power to the RFID transponder. In an alternative embodiment, the power-dependent control signal generated at 206 is an output signal of one or more comparators. As mentioned above, one or more comparators may be used to continuously compare the value of the power indicator signal with one or more thresholds and generate an output signal as the power-dependent control signal.

At 208, the current consumption of a memory of the RFID transponder is controlled in response to the power-dependent control signal generated at 206. As mentioned above, the power-dependent control signal is used to control the amount of current that can be consumed by the memory via a charge pump. More specifically, depending on the amount of power available to the RFID transponder, the power-dependent control signal is used to control the amount of current that the charge pump drivers are allowed to use for providing the driving capability to the charge pump, which in turn for allowing the memory to be programmed faster or lower.

At 210, memory operations are controlled (e.g., stop, slow, or continue) in response to the current control performed in 208.

Thus, by continuously monitoring the amount of available power to the RFID transponder and controlling the current consumption of the memory in dependence on the available power, a good balance between memory operations and the available power can be achieved for RFID transponders with ultra-low power memories, e.g., HF or UHF RFID tags.

Figure 3:
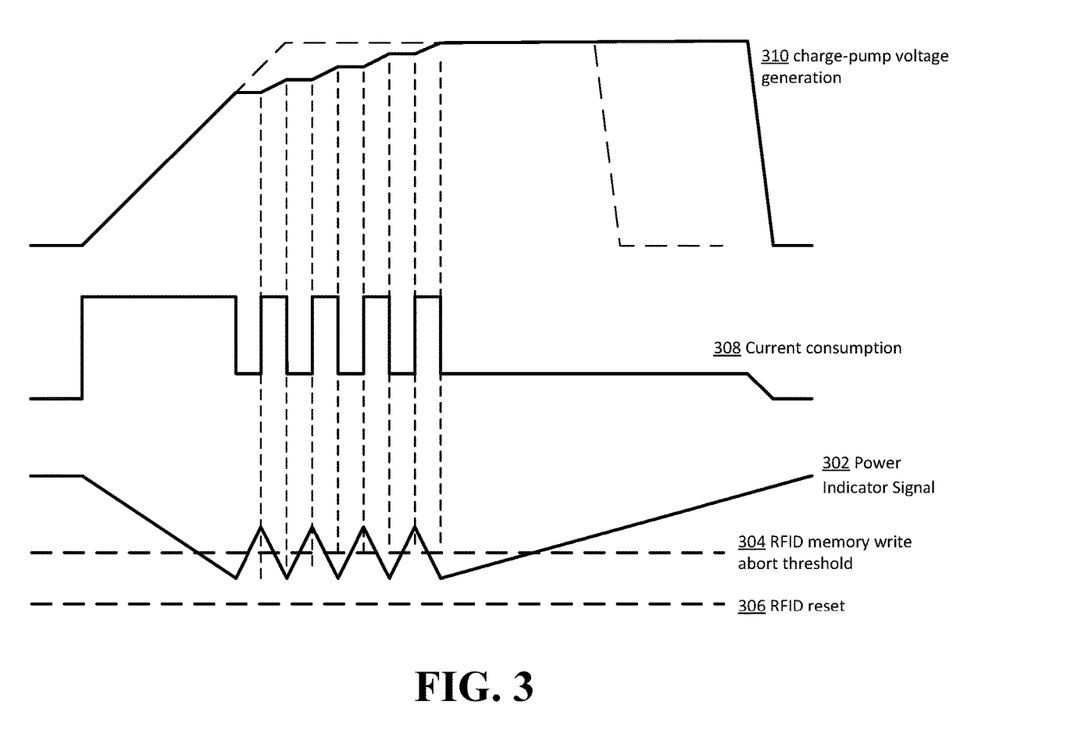
FIG. 3 depicts an example of a state-of-the-art time discrete memory operation of an RFID transponder.

FIG. 3 depicts an example of a state-of-the-art time discrete memory operation of an RFID transponder. Specifically, FIG. 3 depicts an example in which the memory of the RFID transponder is written with a limited energy supply using the time discrete sampling approach. An RFID reset threshold 306 is used to safeguard the RFID transponder from reset due to a lack of energy condition. In addition, an RFID memory abort threshold 304 is set above the RFID reset threshold for preventing the corruption or destruction of the RFID memory. The state-of-the-art time discrete sampling approach as shown in this example will not work well if the available power falls fast, like for a UHF (ultra-high frequency) field.

Figure 4A:
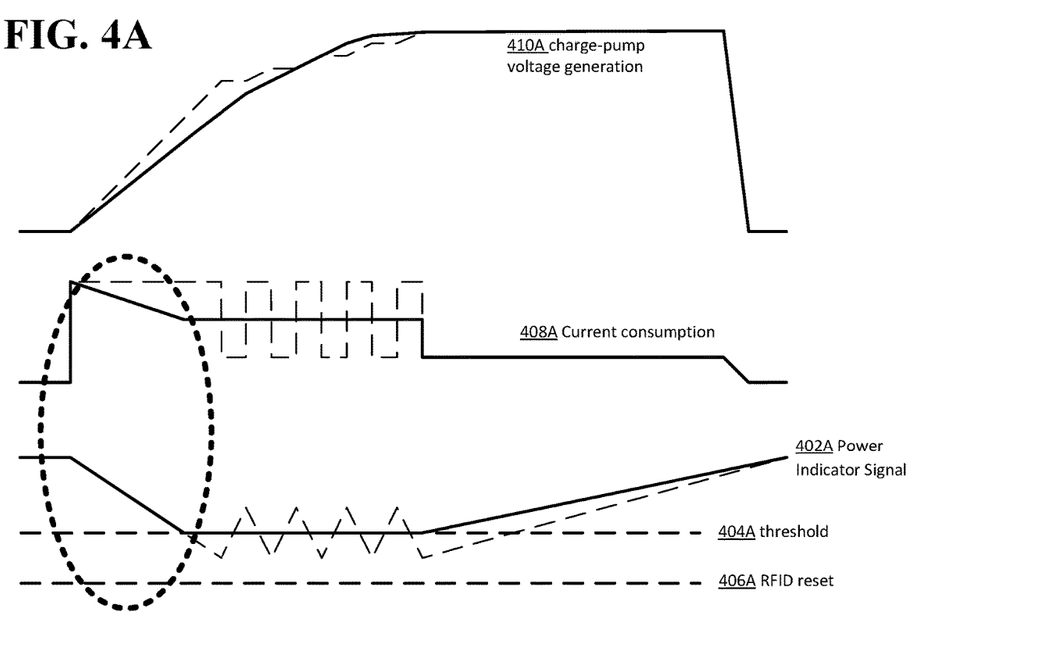
FIG. 4A depicts an example of time continuous memory operation of an RFID transponder.

FIG. 4A depicts an example of time continuous memory operation implemented for an RFID transponder, e.g., RFID transponder 100 of FIG. 1. Specifically, FIG. 4A depicts an example in which the memory of the RFID transponder is written with a limited energy supply by continuously monitoring the available energy (power indicator signal 402A) and controlling (modulating) the current consumption in dependence on the available energy. In this manner, the memory operation of the transponder (stop or continue) can be controlled in dependence on the available energy. In this particular example, a single threshold (404A) is used.

Figure 4B:
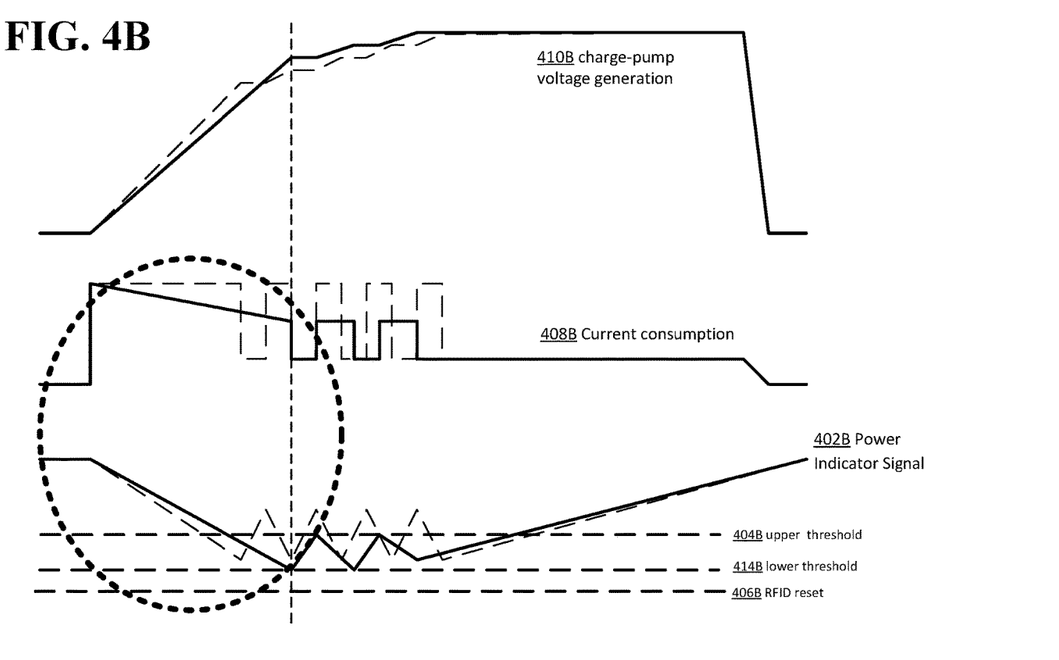
FIG. 4B depicts yet another example of time continuous memory operation of an RFID transponder.

FIG. 4B depicts yet another example of time continuous memory operation implemented for an RFID transponder, e.g., RFID transponder 100 of FIG. 1. Specifically, FIG. 4B depicts an example in which the memory of the RFID transponder is written with a limited energy supply by continuously monitoring the available energy (power indicator signal 402B) and controlling (modulating) the current consumption in dependence on the available energy. In this manner, the memory operation of the transponder (stop or continue) can be controlled in dependence on the available energy. In this particular example, an upper threshold (404B) and a lower threshold (414B) are used. This allows the system to harvest energy (memory operation is stopped during energy harvesting) if the available energy falls below the lower threshold, and to consume energy (memory operation is resumed) if the available energy is above the upper threshold.

Figure 5:
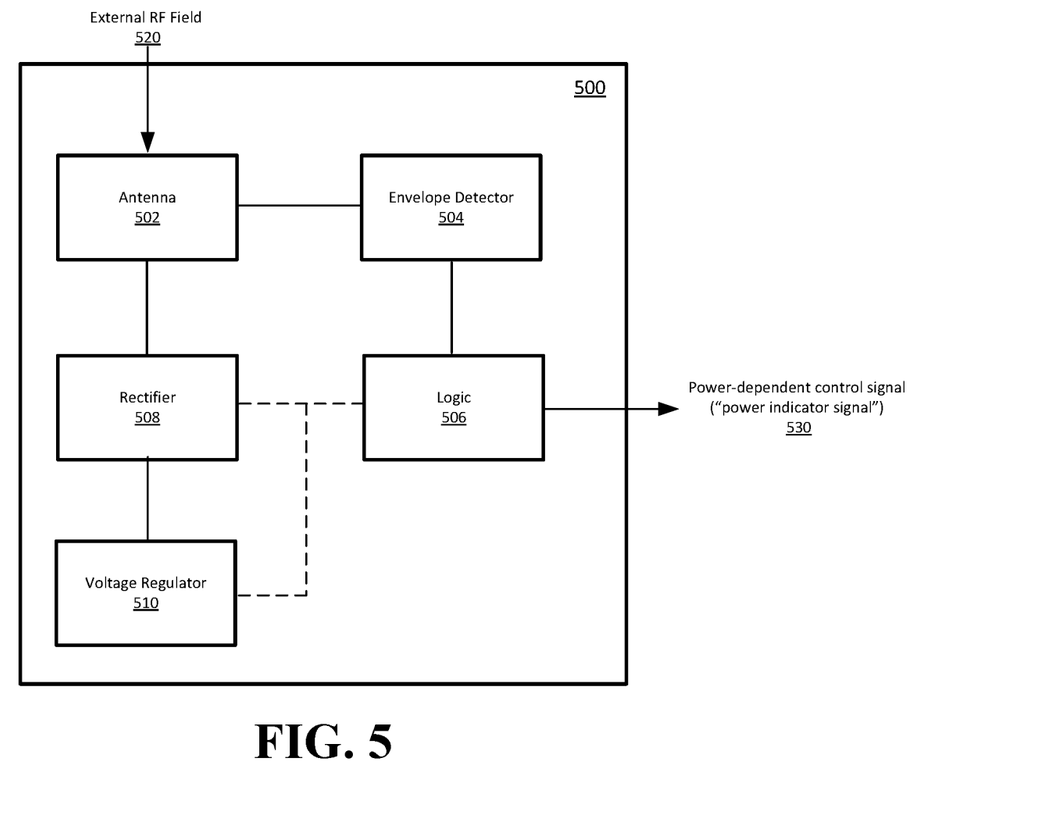
FIG. 5 shows an illustrative embodiment of a power detector of an RFID transponder.

FIG. 5 shows an illustrative embodiment of a power detector of an RFID transponder. As depicted in FIG. 5, power detector 500 includes an envelope detector 504 that is operatively coupled to an antenna 502 for tracking the RF energy received by the antenna from an external reader (not shown). A logic 506 is operatively coupled to the envelope detector for providing a power-dependent control signal 530 at the output of the power detector. The power-dependent control signal is indicative of the amount of power available to the RFID transponder.

In this embodiment, since power-dependent control signal 530 is indicative of the amount of power available to the RFID transponder, this signal is also known as the "power indicator signal." As mentioned previously with reference to FIG. 1. the term "power indicator signal" is referred to the signal that is indicative of the available amount of power to the RFID transponder. The power indicator signal has a faster fall-time if the RF field strength, and thus the available energy, is lower. Conversely, for higher field strengths the power indicator signal has a slower fall-time.

Alternatively, the internal voltage level of the RFID transponder can be tracked to provide an indication of the available amount of power. This can be done by coupling a rectifier 508 and/or a voltage regulator 510 to logic 506 (shown by the dashed lines) for providing a power-dependent control signal 530 at the output of the power detector. The power-dependent control signal is indicative of the amount of power available to the RFID transponder.

Figure 6:
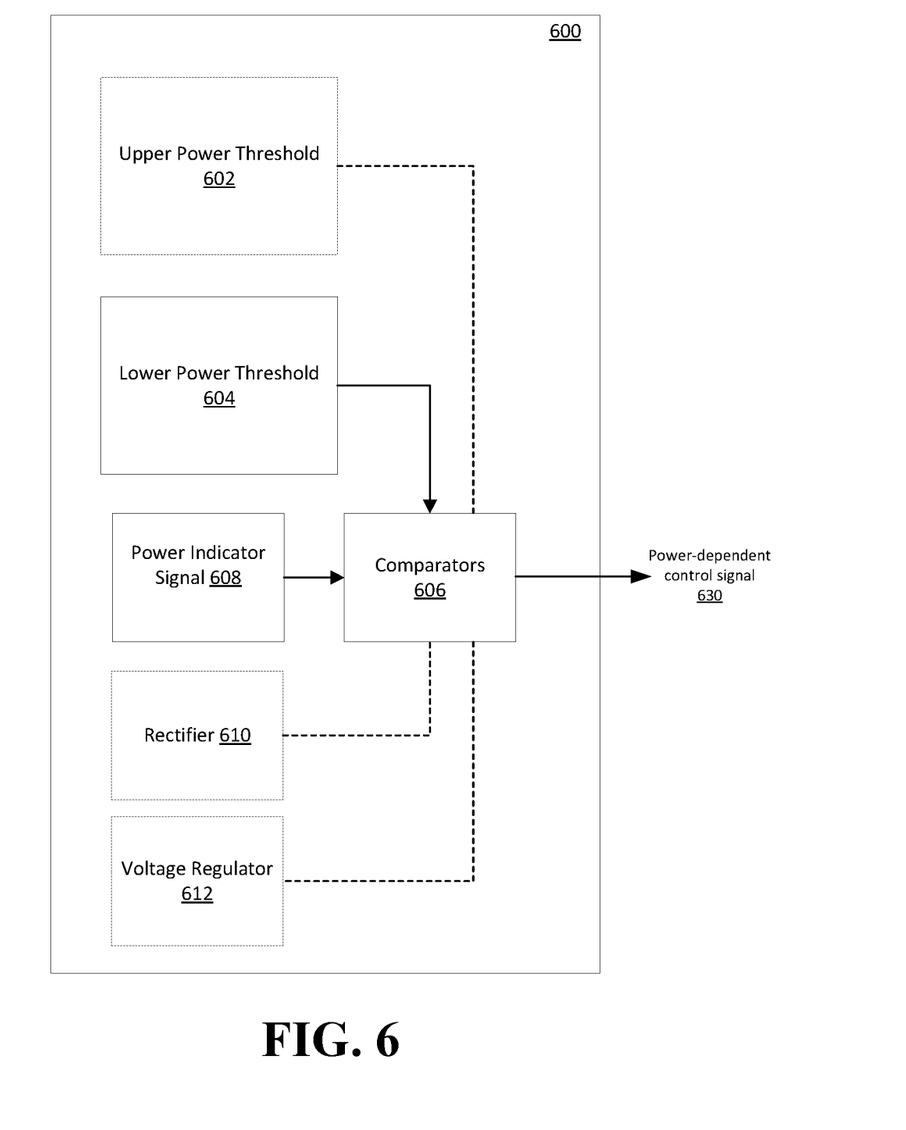
FIG. 6 shows another illustrative embodiment of a power detector of an RFID transponder.

FIG. 6 shows another illustrative embodiment of a power detector of an RFID transponder. As depicted in FIG. 6, power detector 600 includes one or more comparators 606 that are configured to continuously compare the level of power indicator signal 608 with one or more thresholds (602, 604) and generate a power-dependent control signal 630 at the output of the power detector. In one embodiment, power indicator signal 608 is generated and provided by power detector 500 of FIG. 5.

For example, one of the one or more comparators 606 is configured to continuously compare the value of the power indicator signal to a lower power threshold 604 and provide an output signal (i.e., power-dependent control signal 630) if the value of the power indicator signal falls below the lower power threshold. This output signal (i.e., power-dependent control signal 630) is provided to a current control module of the RFID transponder to control the power (current) consumption of the memory of the transponder. In this example, the memory operation stops if the value of the power indicator signal falls below the lower power threshold.

Alternatively, or in addition, one of the one or more comparators 606 is coupled to an upper power threshold 602 and configured to continuously compare the value of the power indicator signal to the upper power threshold, and provide an output signal (i.e., power-dependent control signal 630) if the value of the power indicator signal exceeds the upper power threshold. This output signal (i.e., power-dependent control signal 630) is provided to a current control module of the RFID transponder to control the power (current) consumption of the memory of the transponder. In this case, the memory operation continues (starts or restarts) if the value of the power indicator signal exceeds the upper power threshold. One advantage of having multiple thresholds is to allow an energy recovery state, which is especially critical to battery-less RFID tags.

In alternative embodiments, comparators 606 are coupled to a rectifier 610 and/or a voltage regulator 612 and configured to compare an internal voltage level of the RFID transponder with the thresholds (602, 604) and generate the power-dependent control signal at the output of the power detector.

It is noted that there is no clock signal being used here for time discrete sampling of the output signal of the comparators, thus the term "continuously" is used to distinguish the illustrative embodiment from state-of-the-art implementations. FIG. 3 above describes an example of a state-of-the-art time discrete memory operation of an RFID transponder.

Figure 7:
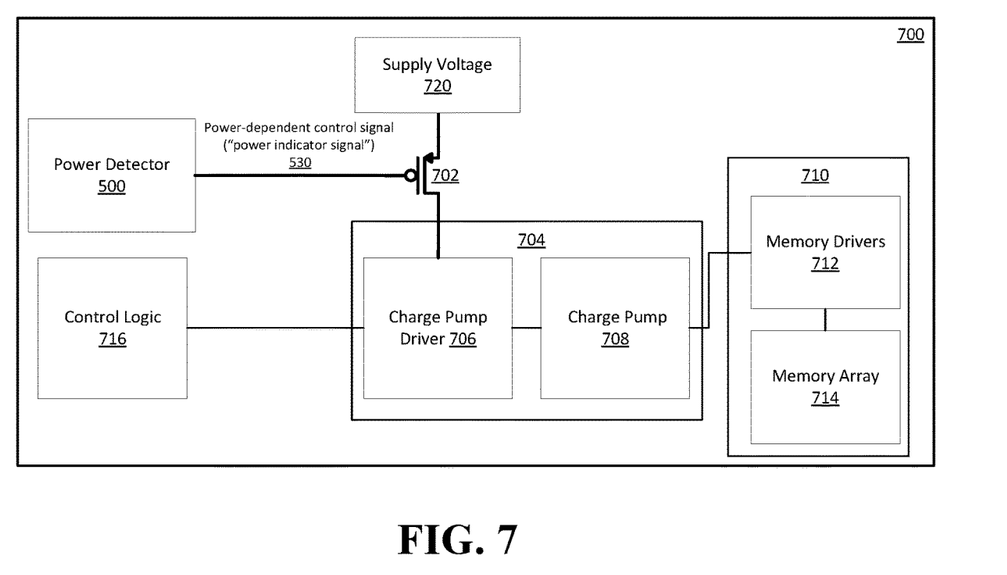
FIG. 7 shows an illustrative embodiment of an RFID transponder incorporating the power detector of FIG. 5.

FIG. 7 shows an illustrative embodiment of an RFID transponder. As depicted in FIG. 7, RFID transponder 700 includes power detector 500 of FIG. 5, which is operatively coupled to a current control module 702 and outputs a power-dependent control signal 530 to the current control module. In this embodiment, the current control module is a PMOS transistor. The current control module is configured to control the current consumption of memory 710 in dependence on the amount of power available to the RFID transponder. Specifically, in the shown embodiment, current control module 702 receives power-dependent control signal 530 from power detector 500 and use the power-dependent control signal to control the amount of current that can be consumed by memory 710 via a charge pump module 704. A supply voltage 720, which is derived from an RF field generated by an external RFID reader, is provided to the input of the current control module.

RFID transponder 700 further includes a charge pump module 704, which is operatively coupled to current control module 702 and a control logic 716. In operation, charge pump module 704 receive an input voltage (current) from current control module 702 and supplies an output voltage to memory 710 for carrying out various memory operations. Specifically, in the shown embodiment, charge pump module 704 includes a charge pump driver 706 for driving a charge pump 708. For example, depending on the amount of power available to the RFID transponder, current control module 702 controls the amount of current that the charge pump driver is allowed to use for providing the driving capability to charge pump 708, which in turn for allowing memory 710 to be programmed faster or lower.

Referring to FIG. 7, RFID transponder 700 also includes control logic 716, which is operatively coupled to charge pump module 704 and memory 710 for controlling the operations of the charge pump and the memory. Specifically, control logic 716 is configured to control (stop, slow, or continue) the memory operations in response to the current control as discussed above. That is, control logic 716 stops a memory operation if there is insufficient current available for the memory operation as a result of the current control in response to the amount of available power detected, slows down a memory operation if there is reduced current available for the memory operation as a result of the current control in response to the amount of available power detected, or starts or restarts a memory operation if there is sufficient current available as a result of the current control in response to the amount of available power detected.

Thus, by continuously monitoring the amount of available power to the RFID transponder and controlling the current consumption of the memory in dependence on the available power, a good balance between memory operations and the available power can be achieved for RFID transponders with ultra-low power memories, e.g., HF or UHF RFID tags.

Figure 8:
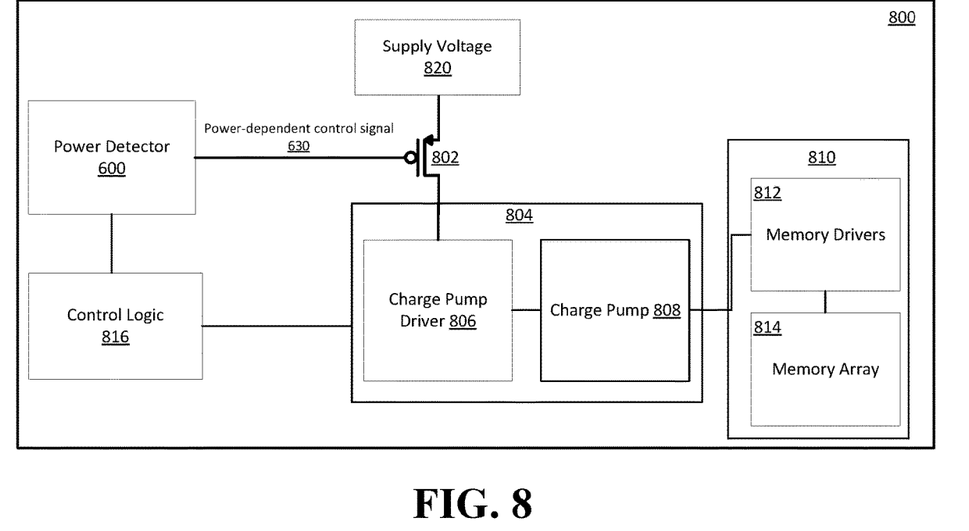
FIG. 8 shows another illustrative embodiment of an RFID transponder incorporating the power detector of FIG. 6.

FIG. 8 shows another illustrative embodiment of an RFID transponder.

As depicted in FIG. 8, RFID transponder 800 includes power detector 600 of FIG. 6, which is operatively coupled to a current control module 802 and outputs a power-dependent control signal 630 to the current control module. In this embodiment, the current control module is a PMOS transistor. The current control module is configured to control the current consumption of memory 810 in dependence on the amount of power available to the RFID transponder. Specifically, in the shown embodiment, current control module 802 receives power-dependent control signal 630 from power detector 600 and use the power-dependent control signal to control the amount of current consumption for various memory operations via a charge pump module 804. A supply voltage 820, which is derived from an RF field generated by an external RFID reader, is provided to the input of the current control module.

RFID transponder 800 further includes a charge pump module 804, which is operatively coupled to current control module 802 and a control logic 816. In operation, charge pump module 804 receive an input voltage (current) from current control module 802 and supplies an output voltage to memory 810. Specifically, in the shown embodiment, charge pump module 804 includes a charge pump driver 806 for driving a charge pump 808. Here, depending on the amount of power available to the RFID transponder, current control module 802 controls the amount of current that the charge pump driver can consume for providing the driving capability to charge pump 808, which in turn for allowing memory 810 to be programmed faster or lower.

Referring to FIG. 8, RFID transponder 800 also includes a control logic 816, which is operatively coupled to charge pump module 804 and memory 810 and configured to control the operations of the charge pump and the memory. Specifically, control logic 816 is configured to control (stop, slow, or continue) the memory operations in response to the current control as discussed above. That is, control logic 816 stops a memory operation if there is insufficient current available for the memory operation as a result of the current control in response to the amount of available power detected, slows down a memory operation if there is reduced current available for the memory operation as a result of the current control in response to the amount of available power detected, or starts or restarts a memory operation if there is sufficient current available as a result of the current control in response to the amount of available power detected.

Furthermore, control logic 816 is also coupled to power detector 600 and configured to receive power-dependent control signal 630 from the power detector. In operation, a clock (not shown) of the control logic, which generates one or more driving signals for the charge pump module, can be made "stop" or "go" in response to the power-dependent control signal. For example, if/when there is an insufficient amount of current available for a memory operation, the clock will stop the memory operation in response to the power-dependent control signal (the available power falls below the lower power threshold). As a result, since there is no current being consumed by the memory operation, the available power is able to rise back up again as more RF energy is received from the field.

Thus, by continuously monitoring the amount of available power to the RFID transponder and controlling the current consumption of the memory in dependence on the available power, a good balance between memory operations and the available power can be achieved for RFID transponders with ultra-low power memories, e.g., HF or UHF RFID tags.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A radio frequency identification (RFID) transponder comprising:
    a power detector to continuously detect an amount of available power derived from an external radio frequency (RF) field and to generate a power-dependent control signal;
    a current control module to control a current consumption of a memory of the RFID transponder during a write operation in response to the power-dependent control signal; and
    a control logic to control the write operation in response to said control of the current consumption by the current control module, wherein the control logic is configured to adjust a speed of the write operation depending on the amount of available power.

2. The RFID transponder of claim 1, wherein the power detector is configured to generate a power indicator signal indicative of the amount of available power and output the power indicator signal to the current control module for controlling the current consumption of the memory of the RFID transponder in response to the power indicator signal.

3. The RFID transponder of claim 1, wherein the power detector includes a first comparator, wherein the first comparator is configured to compare a power indictor signal indicative of the amount of available power with a first threshold and output a power-dependent control signal to the current control module for controlling the current consumption of the memory of the RFID transponder if the value of the power indicator signal is less than the first threshold.

4. The RFID transponder of claim 3, wherein the power detector includes a second comparator, wherein the second comparator is configured to compare the power indictor signal indicative of the amount of available power with a second threshold and output a power-dependent control signal to the current control module for controlling the current consumption of the memory of the RFID transponder if the value of the power indicator signal exceeds the second threshold, wherein the second threshold is an upper threshold and the first threshold is a lower threshold.

5. The RFID transponder of claim 1, wherein the current control module includes a PMOS transistor, herein the power-dependent control signal is applied to a gate of the PMOS transistor.

6. The RFID transponder of claim 1, further comprising a charge pump module coupled to the current control module and the memory,
    wherein the current control module is configured to control the current consumption of the memory includes the current control module controlling an amount of current received by the charge pump module; and
    wherein the charge pump module is configured to provide an output voltage to the memory.

7. The RFID transponder of claim 6, wherein the control logic is operatively coupled to the charge pump module and the memory and configured to control the charge pump and the memory.

8. The RFID transponder of claim 7, wherein the control logic is configured to control the charge pump and the memory includes the control logic controlling a memory write operation in response to the amount of current received by the charge pump module.

9. The RFID transponder of claim 1, wherein the control logic is configured to adjust a speed of the write operation includes the control logic stopping, slowing down or continuing the write operation depending on the amount of available power.

10. The RFID transponder of claim 8, wherein the control logic is further coupled to the power detector and receives the power-dependent control signal from the power detector.

11. The RFID transponder of claim 1, wherein the RFID transponder is one of a high frequency (HF) RFID tag or an ultra-high frequency (UHF) RFID tag.

12. A method for operating a radio frequency identification (RFID) transponder comprising:
    continuously detecting an amount of power available to the RFID transponder, wherein the amount of power available to the RFID transponder is derived from an external radio frequency (RF) field;
    controlling a current consumption of a memory of the RFID transponder during a write operation in response to the amount of available power detected; and
    controlling the write operation of the memory in response to the controlling of the current consumption, wherein controlling the write operation includes adjusting a speed of the write operation depending on the amount of available power.

13. The method of claim 12, wherein detecting an amount of power available to the RFID transponder includes continuously tracking the external radio frequency (RF) field and generating a power indicator signal indicative of the amount of available power.

14. The method of claim 13, wherein detecting an amount of power available to the RFID transponder includes comparing the power indictor signal with a first threshold and outputting a power-dependent control signal for controlling the current consumption of the memory of the RFID transponder.

15. The method of claim 14, wherein detecting an amount of power available to the RFID transponder further includes comparing the power indictor signal with a second threshold and outputting a power-dependent control signal for controlling the current consumption of the memory of the RFID transponder.

16. The method of claim 12, wherein controlling a current consumption of a memory of the RFID transponder during a write operation includes controlling an amount of current received by a charge pump in response to the amount of available power detected, wherein the charge pump supplies an output voltage to the memory.

17. The method of claim 12, wherein adjusting a speed of the write operation includes stopping, slowing down or continuing the write operation depending on the amount of available power.

18. The RFID transponder of claim 11, wherein the memory is an ultra-low-power memory.

* * * * *